Nov. 21, 1939.     H. C. WOHLRAB     2,180,972
METHOD OF MEASURING THE QUALITY OF AN OPTICAL SLIT
Filed April 12, 1938     2 Sheets-Sheet 1
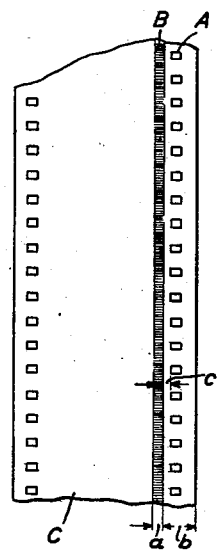
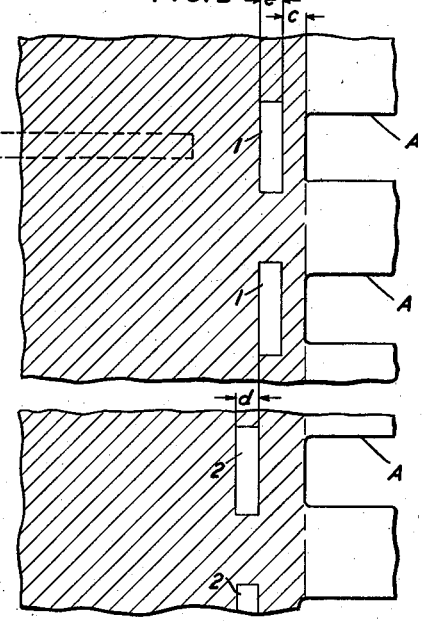
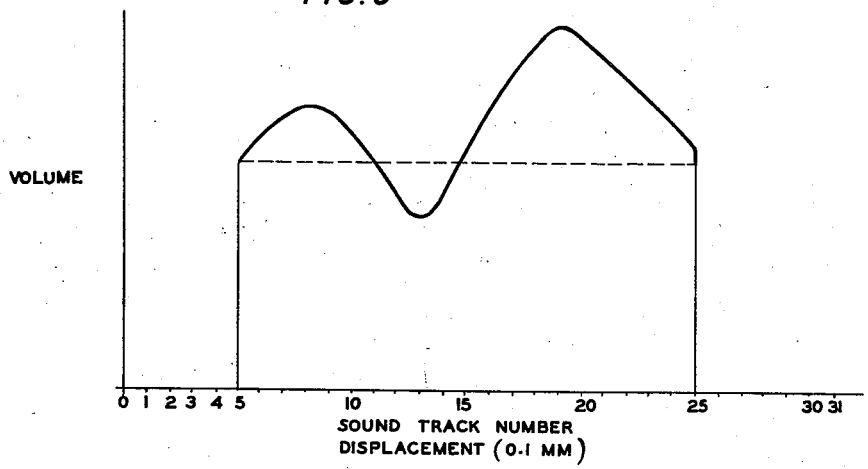
INVENTOR
H.C. WOHLRAB
BY
*G.H.Heydt*
ATTORNEY

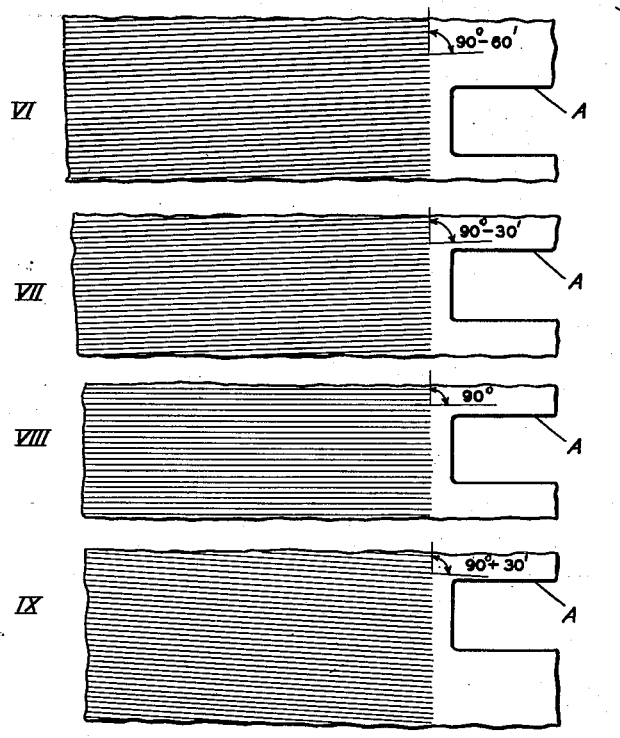
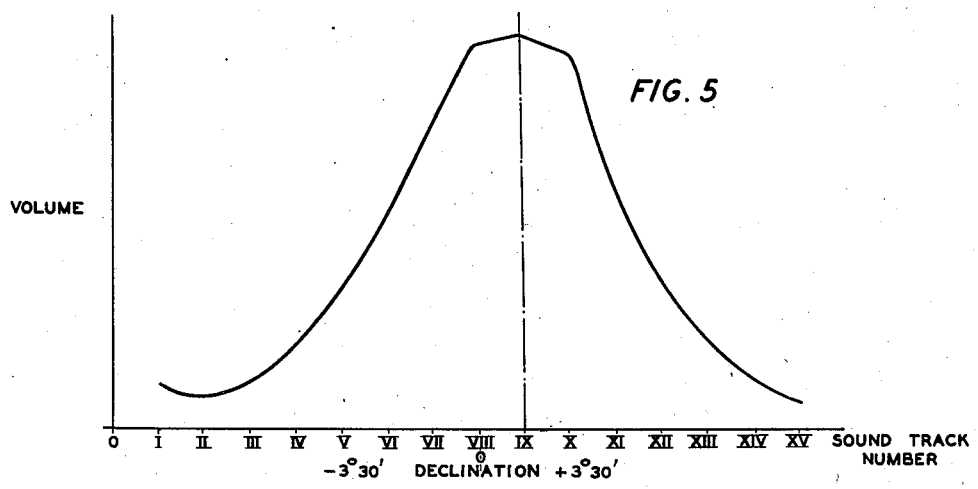

Patented Nov. 21, 1939

2,180,972

UNITED STATES PATENT OFFICE 2,180,972

METHOD OF MEASURING THE QUALITY OF AN OPTICAL SLIT

Hans C. Wohlrab, Berlin-Wilmersdorf, Germany, assignor to Klangfilm Gesellschaft mit beschrankter Haftung, Berlin, Germany, a German company Application April 12, 1938, Serial No. 201,480
In Germany April 29, 1937

3 Claims. (Cl. 179—100.3)

The present invention relates to a method of measuring the quality of scanning beams in sound film apparatus. In particular the invention describes sound films by means of which the length of the beam, the position of the beam with respect to the perforation, the distribution of illumination throughout the beam and the obliquity of the beam can be measured.

According to the invention, sound films with several sound tracks are used for these measurements. These sound tracks have a certain position with respect to the longitudinal direction of the film, as will be described below. One sound film is provided with a record in interrupted rectangular form, but, of course, other forms of recording may be used instead. Preferably this rectangular record has a uniform width over the entire track and is so arranged on the film band in the direction of the film that a lateral displacement of the sound track by a certain amount always takes place after a certain extent of film travel. The laterally displaced sound records are of equal constant frequency and amplitude so that all the elemental areas of light at the slit will be modulated equally. The total width of this record is wider than the reproducing slit. The arrangement of displaced sound tracks may follow in direct succession. Any other sound record, for example a word text, may however also be recorded between two tracks in the longitudinal direction.

Now this film is passed through the reproducing apparatus. Associated with the photocell for instance is a rectifier with a measuring instrument upon which the power delivered from the photocell may be read. If this sound film is run through the reproducing apparatus, the first sound track will still not produce any impulses on the photocell, if it lies outside the slit. Perhaps the second sound track already lies within the slit, so that light falls on the photocell. The power delivered may now be read at the measuring instrument. As the entire film runs successively through the reproducing device, the power delivered by each individual sound track can be measured until the record again lies outside the slit. As the width of slit and therefore the slit illumination is not perfectly uniform, the delivered power will fluctuate so that by means of the various measuring points the exact illumination of the slit can be determined. The first record is so arranged that a certain distance is maintained from the perforation. The width of the various records is preferably equal. Consequently both the length of the slit and also the position of the slit with respect to the perforation can be determined.

In order to determine the obliquity of the slit a second film may be used, this having several sound tracks arranged one behind the other, for example in variable density recording. The various sound tracks have an angular position with respect to the direction of film movement and are preferably wider than the slit. Each of them is displaced by a constant angle with respect to the next one; for example, the arrangement may be such that one track is recorded at right angles to the direction of film movement while the preceding one deviates by a certain angle in one direction with regard to this track, while the one following this sound track recorded at right angles to the film movement, deviates by the same angle in the other direction.

Now it is a well-known fact that during the travel of a film the power delivered is a maximum when the record striation and the reproducing beam are parallel. Thus, if a film having series of records as previously described is passed through a reproducing apparatus, the power delivered will vary with the angularity of the portion of the record being reproduced.

Examples of the present invention will now be explained with the aid of the figures.

Fig. 1 shows a normal sound film;

Fig. 2 a sound film strip to an enlarged scale for measuring the position and the illumination of the slit;

Fig. 3 is the curve recorded with the film according to Fig. 2;

Fig. 4 shows a film for measuring the obliquity of the slit;

Fig. 5 is the curve taken with this film.

In these drawings the same reference numerals are used for the same parts.

Fig. 1 shows the usual sound film with the perforation holes A and the sound track B. The surface C serves for receiving the picture. The sound track B has a certain width $a$ and a certain margin distance $b$. Further, the distance $c$ of the sound track from the edge of the perforations is indicated.

Now Fig. 2 shows a sound film to a large scale such as it is intended to use according to the invention. The reproducing slit D is indicated with dotted lines. This sound film may have, for example, a record of 800 cycles in rectangular form. The various sound tracks of which 31 are provided, are about 1.5 meters long and are displaced by an amount $d$, which according to the invention is 0.1 millimeter. Between the various sound tracks in the longitudinal direction there is a text inscription in which the current number of the sound track is given, for example, 1, 2, 3, etc. The total width of the sound track thus amounts to 31×0.1=3.1 millimeters. The width will be so chosen that it is greater than that of the reproducing slit. In the film, in accordance with the invention, as shown in Fig. 2, the longitudinal strip of film adjacent one row of film perforations in which the laterally displaced records are to be located is made opaque with the exception of the area occupied by each of the laterally displaced records, so that no light will reach the photoelectric cell except that admitted by sound records.

The measurement is carried out as follows: The film is placed in the reproducing apparatus and played off. The sound track 1 still lies outside the slit so that no light still falls upon the photocell and consequently still no performance is indicated at the associated measuring instrument. Moreover, the sound tracks 2–4 will also lie outside the slit. Only at the sound track 5 does light fall through the slit. The same applies also to the sound tracks 6–25. The delivered power which is brought about by the various sound tracks can be plotted on a graph sheet as indicated in Fig. 3. This graph must have, for example, a linear scale in both axial directions. Theoretically, with an ideal slit the various sound track measurement points should give a line parallel with the X-axis (indicated dotted) if the slit illuminations were uniform. This, however, is not usually the case; thus, some form of curve ordinarily results, Fig. 3 illustrating a not uncommon variety. From this curve it is now possible to ascertain to what extent the slit illumination is uniform. Furthermore, it is also possible to ascertain that the slit begins at the sound track 5 and ends at the track 25, that is, it has a width of 2.0 millimeters. As the distance of the first record from the edge or from the perforations is fixed, it is possible to read from the record what distance the slit is from the perforation.

Fig. 4 shows the sound film by means of which the slit obliquity can be measured. According to the invention, it has 15 sound tracks which are arranged in the longitudinal direction of the film one behind the other. Each sound track is 1.5 meters long and may have a 5,000 cycle variable density record. Between the various sound tracks there are sound registrations which contain the numbers and the position of the sound tracks. In the drawings the record VIII forms an angle of 90 degrees with the longitudinal direction of the film. Towards the smaller numbers of the sound track, this angle will diminish by a certain angle, for example, 30 minutes, and to the larger sound track numbers it will increase by the same amount. In its present form the record will have at least the width of the slit. Now, if such a film is allowed to run through the reproducing device and if the power delivered by the photocell is measured, the curve obtained by plotting the values will be, for example, as shown in Fig. 5. From this curve it will be apparent that the maximum of the power lies at the point IX. If the power at the points VIII and X were equal it would indicate that the slit is parallel with the record striation of record IX and, therefore, have an inclination with respect to normal amounting to +30′. However, the curve shows that the power at point VIII is greater than the power at point X, indicating that the slit has an inclination between normal, as represented by record VIII, and +30′ with respect to normal as represented by record IX.

Thus, it is clear that by means of the invention a simple and accurate measurement of the quality of a reproducing slit may be made.

What is claimed is:

1. The method of determining the uniformity of illumination of a fixed slit in a film sound recording system which comprises illuminating said slit, successively modulating the light at a plurality of transverse elemental areas of the slit by a sound record of constant frequency and amplitude, translating the record into electrical impulses, and measuring the power of said impulses.

2. In a sound film apparatus having an optical system including an illuminated member having a fixed slit therein, a film provided with a plurality of successive sound records equal in amplitude and of the same frequency each of said records having a width which is a fraction of the length of the slit in said member, the successive records being displaced laterally from the marginal film edge by predetermined amounts, means for moving said film past the fixed slit in said member, and means for converting said sound records into electrical impulses.

3. A test record including a plurality of successive sound records equal in amplitude and of the same frequency, each of said records having a lateral dimension smaller than the lateral dimension of the light beam in optical systems to be tested thereby, the successive records being laterally displaced progressively increasing distances from the marginal film edge.

HANS C. WOHLRAB.